US008570781B2

(12) United States Patent
Mabuchi et al.

(10) Patent No.: US 8,570,781 B2
(45) Date of Patent: Oct. 29, 2013

(54) POWER CONDITIONER

(71) Applicant: Omron Corporation, Kyoto (JP)

(72) Inventors: Masao Mabuchi, Shiga (JP); Kazuyoshi Imamura, Shiga (JP); Yasuhiro Tsubota, Shiga (JP); Takao Mizokami, Shiga (JP); Katsutaka Tanabe, Shiga (JP); Teruyuki Maeda, Shiga (JP); Kotaro Nakamura, Shiga (JP); Nobuyuki Toyoura, Shiga (JP); Mio Yamada, Fukuoka (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 13/718,244

(22) Filed: Dec. 18, 2012

(65) Prior Publication Data

US 2013/0107597 A1     May 2, 2013

Related U.S. Application Data

(63) Continuation of application No. PCT/JP2011/056527, filed on Mar. 18, 2011.

(30) Foreign Application Priority Data

Sep. 13, 2010  (JP) ................................. 2010-204317

(51) Int. Cl.
*H02M 7/537*     (2006.01)
*H02M 7/5387*    (2007.01)

(52) U.S. Cl.
USPC ............................. 363/124; 363/98; 323/906

(58) Field of Classification Search
USPC ................. 363/65, 71, 95, 98, 124, 131, 132; 323/906

See application file for complete search history.

(56) References Cited

U.S. PATENT DOCUMENTS

| | | | |
|---|---|---|---|
| 5,654,591 A * | 8/1997 | Mabboux et al. | 307/66 |
| 6,697,271 B2 * | 2/2004 | Corzine | 363/71 |
| 8,184,461 B2 * | 5/2012 | Mabuchi et al. | 363/124 |
| 8,184,462 B2 | 5/2012 | Mabuchi et al. | |
| 8,385,097 B2 * | 2/2013 | Asplund | 363/131 |
| 2010/0232192 A1 | 9/2010 | Mabuchi et al. | |

(Continued)

FOREIGN PATENT DOCUMENTS

| JP | 2002-10496 | 1/2002 |
|---|---|---|
| JP | 2004-7941 | 1/2004 |

(Continued)

OTHER PUBLICATIONS

U.S. Appl. No. 13/718,090 to Mabuchi et al., filed Dec. 18, 2012.

(Continued)

*Primary Examiner* — Gary L Laxton
(74) *Attorney, Agent, or Firm* — Greenblum & Bernstein, P.L.C.

(57) ABSTRACT

A power conditioner that suppresses generation of voltage spikes in a part of a generated sinusoidal voltage waveform. An offset between the timing of chopping, which depends on whether the voltage difference between the voltage of a third pulse voltage series and a sinusoidal voltage is positive or negative, and the timing of the switching between on/off duty cycles of a seventh and eighth switch is calculated, and the on/off duty cycles of the seventh and eighth switches are controlled on the basis of the timing offset.

2 Claims, 7 Drawing Sheets

(56) References Cited

U.S. PATENT DOCUMENTS

| | | | |
|---|---|---|---|
| 2011/0103116 A1* | 5/2011 | Asplund | 363/131 |
| 2011/0235384 A1* | 9/2011 | Mabuchi et al. | 363/132 |
| 2011/0273916 A1* | 11/2011 | Fujiwara et al. | 363/71 |
| 2013/0107596 A1* | 5/2013 | Mabuchi et al. | 363/124 |

FOREIGN PATENT DOCUMENTS

| | | |
|---|---|---|
| JP | 2004-120979 | 4/2004 |
| JP | 2009-165222 | 7/2009 |
| JP | 2010-11702 | 1/2010 |
| JP | 2010-35252 | 2/2010 |
| JP | 2010-220320 | 9/2010 |
| WO | 2008/102552 | 8/2008 |
| WO | 2012/035808 | 3/2012 |

OTHER PUBLICATIONS

International Search Report in related PCT/JP2011/056527 dated May 17, 2011, with an English language translation thereof.

* cited by examiner

POWER CONDITIONER

CROSS-REFERENCE TO RELATED APPLICATIONS

This is a continuation application of PCT/JP2011/056527 filed Mar. 18, 2011, designating the United States of America, the disclosure of which, including the specification, drawings, and claims, is incorporated by reference in its entirety. The disclosure of Japanese Patent Application No. 2010-204317 filed Sep. 13, 2010, including the specification, drawings, and claims is expressly incorporated herein by reference in its entirety.

FIELD OF DISCLOSURE

The present disclosure relates to a power conditioner used in a chopper type power conversion apparatus that chops a DC power to convert the DC power into an AC power.

BACKGROUND INFORMATION

Nowadays, a power generation system, in which a photovoltaic cell, a fuel cell, and the like having less influence on an environment are used, is actively developed from the viewpoint of global environment protection.

In some of the power generation systems, a DC power from DC power sources such as the photovoltaic cell, which generate an electric power, is converted into an AC power having a commercial frequency that is linked to a system by a power conditioner. The post-conversion AC power is supplied to a domestic load connected to a commercial electric power system. On the other hand, an excess power flows back to a system side when the electric power generated by the DC power source is higher than a consumed power of the domestic load.

The power conditioner used in the power generation system generally includes an inverter that converts the DC power generated by the photovoltaic cell and the like into the AC power and a protection device that is used in system linkage. The power conditioner is roughly divided into an insulation type in which a DC unit and an AC unit are electrically insulated by an insulation transformer and a non-insulation type in which the insulation transformer is not used. The non-insulation type is frequently used because the non-insulation type is excellent in power conversion efficiency compared with the insulation type (for example, see Patent Document 1).

PATENT DOCUMENT

Patent Document 1: Japanese Unexamined Patent Publication No. 2002-10496

PROBLEMS TO BE SOLVED BY THE DISCLOSURE

FIG. 8 illustrates a configuration example of a photovoltaic power generation system including a non-insulation type power conditioner. A power conditioner 36 performs a linkage operation with a commercial power source 2. The power conditioner 36 includes a smoothing capacitor 33, a PWM-control inverter 34, a filter 35 including a reactor and a capacitor, and a control circuit (not illustrated). The smoothing capacitor 33 smoothes a power generation output from a photovoltaic panel 1. The inverter 34 is constructed by switch elements 37 to 40 that include four MOSFETs in which a diode is connected in inversely parallel. Switching control is performed to the switch elements 37 to 40 of the inverter 34 at a high frequency of about 18 kHz, whereby the power generation output of the photovoltaic panel 1, which is smoothed by the smoothing capacitor 33, is converted into the AC power synchronized with the commercial electric power system. The power conditioner 36 supplies the converted AC power to a load (not illustrated) through the filter 35 or flows the AC power back to the system side.

In the PWM-control inverter 34 included in the power conditioner 36, it is necessary to convert the DC power having a high voltage, for example, about 800 V from the photovoltaic panel 1 into the AC power by performing the switching operation of the switch elements 37 to 40 at the high frequency of about 18 kHz. Therefore, in the power conversion apparatus including the conventional power conditioner 36, a large switching loss is generated in the electric power conversion of the power conditioner 36, which results in a problem of the low power conversion efficiency.

In order to solve the problem, the inventors filed Japanese Patent Application No. 2009-61915, "Power conversion apparatus, power conditioner, and power generation system", on Mar. 13, 2009.

However, in the power conditioner of Japanese Patent Application No. 2009-61915, voltage spikes are partially generated in a waveform of a generated sinusoidal voltage.

An object of the present disclosure is to provide a power conditioner that suppresses the generation of voltage spikes in a part of the waveform of the sinusoidal voltage in the power conditioner of Japanese Patent Application No. 2009-61915.

SUMMARY OF THE DISCLOSURE

A power conditioner according to a first aspect of the present disclosure includes a first group and a second group (first and second switch circuits), a capacitor, and control means (a controller processor). Each of the first group and the second group includes two series-connected switch elements (pairs of switches). A capacitor is connected in parallel with each of the first group and the second group. The control means alternately turns on and off the switch elements of the first group at a predetermined frequency, and alternately turns on and off the switch elements of the second group at a frequency higher than the predetermined frequency. The control means forms a pulse voltage series that changes in a sinusoidal manner in a first series-connected portion of the switch elements of the first group, forms a difference voltage according to a difference between the pulse voltage series and a sinusoidal voltage in a second series-connected portion of the switch elements of the second group, and controls on/off duty cycles of the switch elements of the second group to obtain the sinusoidal voltage that changes onto positive and negative sides. The control means calculates an offset between the timing of chopping between positive and negative of the difference voltage between the pulse voltage series and the sinusoidal voltage and timing of switching between the on/off duty cycles of the switch elements of the second group. The control means controls the on/off duty cycles of the switch elements of the second group according to the timing offset related to the calculation.

A power conditioner according to a second aspect of the present disclosure includes first to third chopper circuits and control means (a controller processor), in a power conditioner that converts a DC power from a DC power source into an AC power that is system-linked to a commercial power source. The first chopper circuit includes a first switch circuit that includes series-connected first and second switch elements (switches). The first and second switch elements are alternately turned on and off at a first frequency, chop a DC voltage from a DC power source at the first frequency, and generate a first pulse voltage series having a voltage in which a voltage level becomes a positive side with respect to a first reference potential. The second chopper circuit includes a parallel-connected circuit that includes a second capacitor and a second switch circuit. One side of a parallel connection of the parallel-connected circuit is connected to the series-connected portion of the first and second switch elements. The second switch circuit is constructed by connecting third and fourth switch elements in series. The third and fourth switch elements are alternately turned on and off at a second frequency. The third and fourth switch elements chop an output of the first chopper circuit at a second frequency higher than predetermined times the first frequency while the first pulse voltage series is set to a second reference potential, and generate a second pulse voltage series having a voltage V2, a voltage level of the voltage V2 being lower than that of the first pulse voltage series, the voltage V2 being a negative side with respect to the second reference potential. The third and fourth switch elements adds voltages at the first and second pulse voltage series to form a third pulse voltage series that changes alternately in a sinusoidal manner onto the positive and negative sides with respect to the first reference potential. The third chopper circuit includes series-connected fifth and sixth switch elements. A series-connected portion of the fifth and sixth switch elements is connected to a series-connected portion of the third and fourth switch element. The fifth and sixth switch elements are alternately turned on and off at a third chopping frequency, and perform a charge and discharge output by chopping the third pulse voltage series according to positive and negative of a difference with a sinusoidal voltage. The third chopper circuit further includes series-connected seventh and eighth switch elements. The third chopper circuit turns on and off the seventh and eighth switch elements at a PWM frequency higher than the third chopping frequency so as to correct the difference between the third pulse voltage series and the sinusoidal voltage, and the third chopper circuit controls on/off duty cycles of the seventh and eighth switch elements to control the charge and discharge output so as to obtain a sinusoidal voltage that changes continuously on the positive and negative sides of the first reference potential. The control means calculates an offset between timing of chopping of the third pulse voltage series according to positive and negative of the difference voltage with the sinusoidal voltage and timing of the switching between on/off duty cycles of the seventh and eighth switch element, and controls the on/off duty cycles of the seventh and eighth switch elements according to the timing offset.

As used herein, "changing alternately in a sinusoidal manner on positive and negative sides" means the positive (one)-side pulse voltage and the negative (the other)-side pulse voltage emerge alternately at a constant cycle with respect to the reference potential, and preferably the pulse cycle is matched with the sinusoidal wave cycle.

Preferably the sinusoidal voltage used to obtain the difference with the pulse voltage series is the sinusoidal voltage that becomes an electric power conversion target, namely, a target value (an instruction value) of the sinusoidal voltage.

The DC power source means power sources, such as the photovoltaic cell, the fuel cell, and wind power generation, which generate the DC power.

The present disclosure can include a power conversion apparatus that chops the DC power to convert the DC power into the AC power. That is, although the present disclosure has the title of the power conditioner, the power conditioner can include the power conversion apparatus.

The present disclosure can be applied to the power conditioner in the power generation system, in which the DC power generated by the DC power source is converted into the AC power by the power conditioner and linked to the commercial power source.

EFFECT OF THE DISCLOSURE

According to the present disclosure, the generation of the voltage spikes in a part of the waveform of the generated sinusoidal voltage can be suppressed.

DETAILED DESCRIPTION

Hereinafter, an embodiment of the present disclosure will be described with reference to the drawings.

Figure 1:
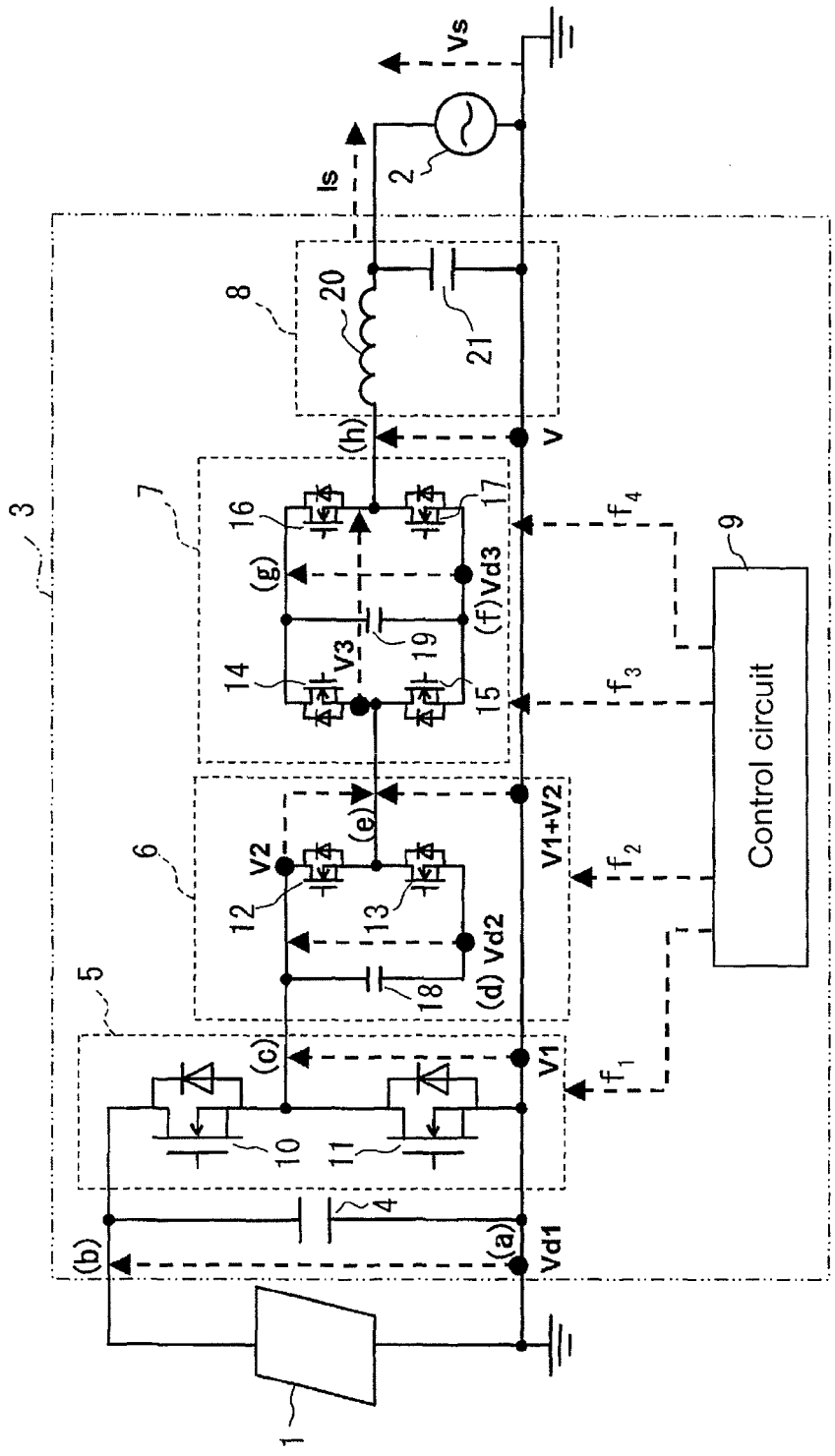
FIG. 1 is a configuration diagram of a photovoltaic power generation system according to an embodiment of the present disclosure.

FIG. 1 is a configuration diagram of a photovoltaic power generation system according to an embodiment of the present disclosure, and illustrates a configuration in the case of a single-phase two-wire system.

The photovoltaic power generation system of the embodiment includes a photovoltaic panel 1, and a power conditioner 3 which converts a DC power from the photovoltaic panel 1 into an AC power and performs a linkage operation with a commercial power source 2.

The photovoltaic panel 1 is configured such that plural photovoltaic modules are connected in series and/or parallel to obtain required electric power. The photovoltaic panel 1 of the embodiment is constructed by an amorphous silicon thin-film photovoltaic cell. The power conditioner 3 of the embodiment is a non-insulation type transformer-less power conditioner that does not include the insulation transformer. The power conditioner 3 includes a first capacitor 4 that is of a smoothing capacitor, first to third chopper circuits 5 to 7, a noise filter 8, and a control circuit 9 that measures voltage at each unit to control the chopper circuits 5 to 7.

The first to third chopper circuits 5 to 7 and the control circuit 9 constitute a chopper converter that is cascade-connected to the photovoltaic panel 1. A negative-electrode side of the photovoltaic panel 1 is connected to the ground. In FIG. 1, a point (a) designates the ground, and the ground has a voltage of zero. A point (b) designates a positive-electrode side of the photovoltaic panel 1. The first capacitor 4 is connected in parallel between the positive and negative electrodes of the photovoltaic panel 1.

The first chopper circuit 5 is connected in parallel with the first capacitor 4. The first chopper circuit 5 includes first and second switch elements 10 and 11 that are connected in series with each other. A diode is connected in inversely parallel with each of the first and second switch elements 10 and 11.

The first chopper circuit 5 constitutes a first switch circuit using the first and second switch elements 10 and 11.

In the first chopper circuit 5, using a gate signal from the control circuit 9, ON/OFF control is alternately performed to the first and second switch elements 10 and 11 at a first chopping frequency f1 that is equal to a system frequency, for example, 50 Hz. For example, the first and second switch elements 10 and 11 are constructed by N-channel MOSFETs like switch elements 12 to 17 of the second and third chopper circuits 6 and 7. The switch element is not limited to the MOSFET, but an IGBT or a transistor may be used as the switch element.

The second chopper circuit 6 includes a second capacitor 18 and a second switch circuit that is constructed by series connection of the third and fourth switch elements 12 and 13, in each of which the diode is connected in inversely parallel. The second capacitor 18 and the second switch circuit are connected in parallel with each other. Using the gate signal from the control circuit 9, the ON/OFF control is alternately performed to the third and fourth switch elements 12 and 13 at a second chopping frequency f2, for example, at 100 Hz which is double the first chopping frequency f1.

One end side of the parallel connection of the second capacitor 18 and the second switch circuit in the second chopper circuit 6 is connected to a series-connected portion of the first and second switch elements 10 and 11 in the first chopper circuit 5. In FIG. 1, a point (c) designates the connection point. In FIG. 1, points (c) and (d) correspond to both capacitor electrode sides of the second capacitor 18.

The third chopper circuit 7 includes a third switch circuit, a third capacitor 19, and a fourth switch circuit. The third switch circuit is constructed by the series connection of the fifth and sixth switch elements 14 and 15, in each of which the diode is connected in inversely parallel. The fourth switch circuit is constructed by the series connection of the seventh and eighth switch elements 16 and 17, in each of which the diode is connected in inversely parallel. In the third chopper circuit 7, the third switch circuit, the third capacitor 19, and the fourth switch circuit are connected in parallel with one another. In FIG. 1, points (f) and (g) designate one end side and the other end side of the parallel connection of the third switch circuit, the third capacitor 19, and the fourth switch circuit. The points (f) and (g) correspond to both capacitor electrode sides of a third capacitor 19.

Using the gate signal from the control circuit 9, the ON/OFF control is alternately performed to the fifth and sixth switch elements 14 and 15 at a third chopping frequency f3, for example, at 150 Hz which is triple the first chopping frequency f1.

Using the gate signal from the control circuit 9, PWM control is performed to the seventh and eighth switch elements 16 and 17 at a high frequency f4, for example, at 18 kHz.

The series-connected portion of the fifth and sixth switch elements 14 and 15 in the third chopper circuit 7 is connected to the series-connected portion of the third and fourth switch elements 12 and 13 in the second chopper circuit 6. In FIG. 1, a point (e) designates the connection point.

A noise filter 8 including a reactor 20 and a fourth capacitor 21 is connected to the series-connected portion of the seventh and eighth switch elements 16 and 17 in the third chopper circuit 7. In FIG. 1, a point (h) designates the connection point.

A load (not illustrated) and the commercial power source 2 are connected to the noise filter 8.

The control circuit 9 measures a system voltage Vs and a system current Is through a differential amplifier circuit (not illustrated), and calculates an instruction value (target sinusoidal voltage) V* of a sinusoidal target voltage synchronized with the system frequency of the commercial power source 2 like the background art. The control circuit 9 measures end-to-end voltages Vd1, Vd2, and Vd3 at the first to third capacitors 4, 18, and 19 through the differential amplifier circuit (not illustrated), and generates the gate signal in order to control the chopper circuits 5 to 7.

The voltage Vd1 is a DC output voltage of the photovoltaic panel 1, which emerges at the point (b) based on the voltage at the point (a) that is of the ground.

The voltage Vd2 is a charge voltage at the capacitor electrode point (c) of the second capacitor 18 of the second chopper circuit 6 based on the capacitor electrode point (d).

The voltage Vd3 is a charge voltage at the capacitor electrode point (g) of the third capacitor 19 of the third chopper circuit 7 based on the capacitor electrode point (f).

Figure 2:
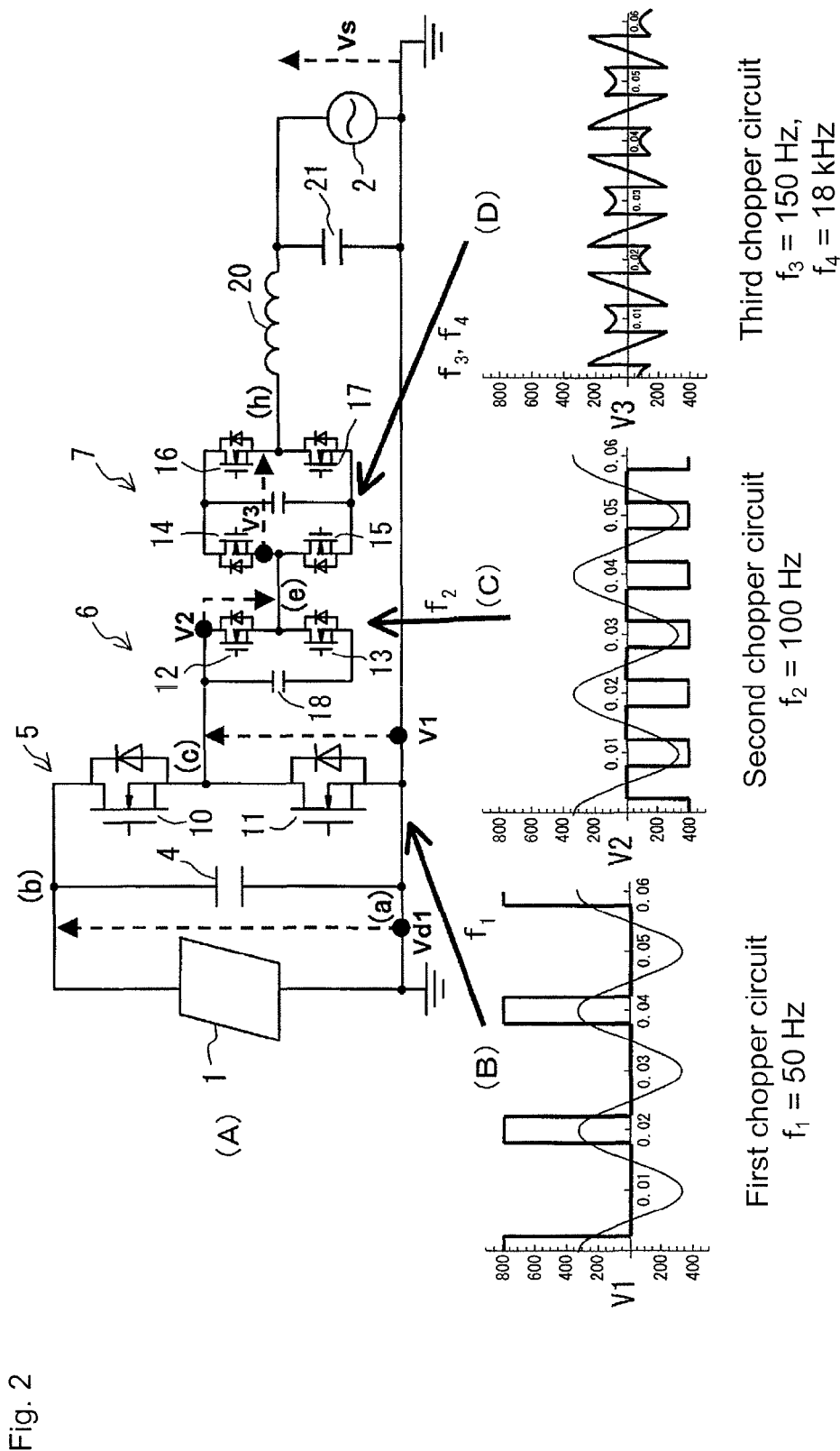
FIG. 2 is a view illustrating an operation of a power conditioner in FIG. 1.

FIG. 2 is a view schematically illustrating operations of the chopper circuit 5 to 7 of the embodiment. FIG. 2(A) is a configuration diagram of a main part in FIG. 1, and FIGS. 2(B) to 2(D) illustrate voltages V1, V2, and V3 in FIG. 2(A). In FIGS. 2(B) and 2(C), a waveform of the target sinusoidal voltage V* synchronized with the system is illustrated by a thin solid line.

Assuming that a first reference potential is a potential at the point (a) that is of the ground, the voltage V1 is the voltage at the point (c) that is of the series-connected portion of the first and second switch elements 10 and 11 in the first chopper circuit 5.

Assuming that a second reference potential is a potential at the point (c), the voltage V2 is the voltage at the point (e) that is of the series-connected portion of the third and fourth switch elements 12 and 13 in the second chopper circuit 6.

The voltage V3 is the voltage at the point (h) that is of the series-connected portion of the seventh and eighth switch elements 16 and 17 based on the point (e) that is of the series-connected portion of the fifth and sixth switch elements 14 and 15 in third chopper circuit 7.

In the case of 50 Hz that is equal to the system frequency of the commercial power source 2, in the first chopper circuit 5, the ON/OFF control is alternately performed to the first and second switch elements 10 and 11 at the first chopping frequency f1 of 50 Hz that is equal to the system frequency.

Therefore, a voltage waveform at the point (c) that is of the series-connected portion of the first and second switch elements 10 and 11 becomes a first pulse voltage series including plural pulse voltages of the voltage V1 on the positive side of the potential at the point (a) as illustrated in FIG. 2 (B). The voltage V1 becomes the DC output voltage of the photovoltaic panel 1.

In the second chopper circuit 6, the ON/OFF control is alternately performed to the third and fourth switch elements 12 and 13 at the second chopping frequency f2 of 100 Hz that is double the first chopping frequency f1.

Therefore, as illustrated in FIG. 2(C), the voltage V2 at the point (e) that is of the series-connected portion of the third and fourth switch elements 12 and 13 becomes a second pulse voltage series including plural pulse voltages that fall onto the negative side based on the point (c) that is of the series-connected portion of the first and second switch elements 10 and 11.

A pulse voltage level of the voltage V2 is controlled so as to become ½ of the DC output voltage Vd1.

Based on the point (a) that is of the ground, namely, based on the first reference potential, the voltage V2 at the point (e) that is of the series-connected portion of the third and fourth switch elements 12 and 13 in the second chopper circuit 6 becomes a pulse voltage V1+V2 in which the voltage V1 between the points (a) and (c) and the voltage V2 between the points (c) and (e) are added as illustrated in FIG. 4(D). That is, the pulse voltage V1+V2 has a stepwise waveform corresponding to the sinusoidal wave that changes alternately into positive and negative values. The stepwise pulse voltage V1+V2 changes alternately into positive and negative values in synchronization with the target sinusoidal voltage V* illustrated by the thin solid line in FIG. 4(D).

In the third chopper circuit 7, the fifth and sixth switch elements 14 and 15 are alternately turned on and off at the third chopping frequency f3 of 150 Hz that is triple the first chopping frequency f1 such that a difference voltage between the stepwise pulse voltage V1+V2 and the instruction value V* of the target sinusoidal voltage is compensated. In the third chopper circuit 7, the seventh and eighth switch elements 16 and 17 are alternately turned on and off at the frequency f4 of 18 kHz.

Therefore, the voltage V3 at the point (h) that is of the series-connected portion of the seventh and eighth switch elements 16 and 17 in the third chopper circuit 7 in FIG. 2(A) becomes the positive side when the fifth switch element 14 is off while the sixth switch element 15 is on as illustrated in FIG. 2(D). The voltage V3 becomes the negative side when the fifth switch element 14 is on while the sixth switch element 15 is on. Magnitude of the voltage V3 corresponds to the difference voltage between the stepwise-waveform voltage V1+V2 and the target sinusoidal voltage V*, and the difference voltage corresponds to magnitude of an on/off duty cycle of the seventh and eighth switch elements 17 and 18.

Operating principles of the first to third chopper circuits 5 to 7 will be described in detail below.

Figure 3:
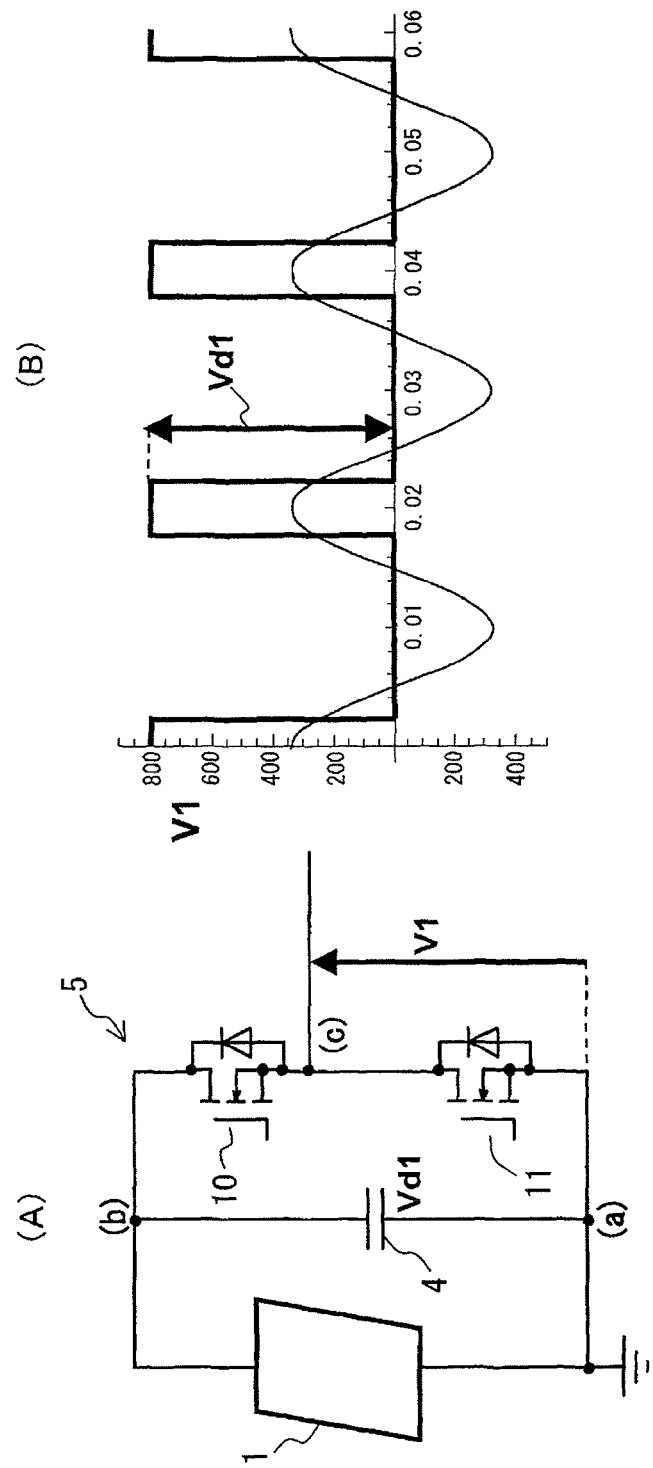
FIG. 3 is a view illustrating an operating principle of a first chopper circuit in FIG. 1.

FIG. 3 is a view illustrating the operating principle of the first chopper circuit 5, FIG. 3(A) illustrates the photovoltaic panel 1, the first capacitor 4, and the first chopper circuit 5, and FIG. 3(B) illustrates the voltage V1 between the points (a) and (c). Particularly, the target sinusoidal voltage V* is illustrated by the thin solid line in FIG. 3(B).

The DC output voltage Vd1 of the photovoltaic panel 1 emerges at the point (b) that is of the positive-electrode side of the photovoltaic panel 1. The DC output voltage Vd1 is smoothed by the first capacitor 4 while the potential at the point (a) that is of the ground is set to the first reference potential.

In the first chopper circuit 5, the DC output voltage Vd1 is chopped by the first and second switch elements 10 and 11 to which the ON/OFF control is alternately performed at the first frequency f1 of 50 Hz.

When the first switch element 10 is on while the second switch element 11 is off, the charge voltage Vd1 of the first capacitor 4 that is of the voltage at the point (b) emerges at the point (c) that is of the series-connected portion of the first and second switch elements 10 and 11 in the first chopper circuit 5.

When the first switch element 10 is off while the second switch element 11 is on, the ground voltage at the point (a) emerges at the point (c) that is of the series-connected portion of the first and second switch elements 10 and 11 in the first chopper circuit 5.

Accordingly, as described above, the voltage V1 at the point (c) that is of the series-connected portion of the first and second switch elements 10 and 11 becomes the first pulse voltage series including the plural pulse voltages that rise onto the positive side while the ground potential is set to the first reference potential as illustrated in FIG. 3(B). The pulse voltage V1 is the voltage at the point (c) that is of the series-connected portion of the first and second switch elements 10 and 11 based on the point (a), and the pulse voltage level becomes the DC output voltage Vd1 of the photovoltaic panel 1, for example, 800 V.

In the first chopper circuit 5, the pulse voltage series in which a phase agrees with that of the system voltage is generated, so that an effective electric power can be output.

Figure 4:
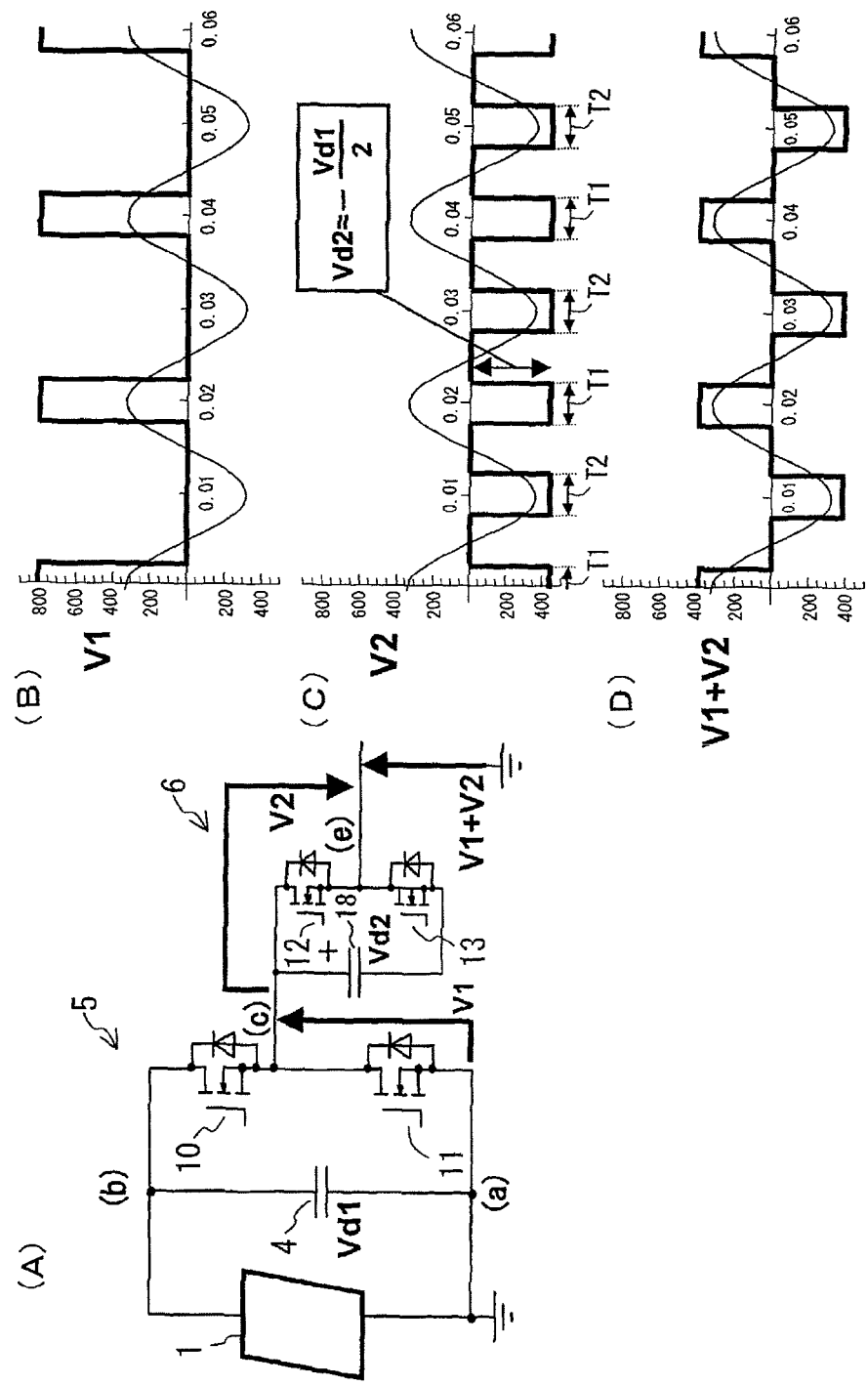
FIG. 4 is a view illustrating an operating principle of a second chopper circuit in FIG. 1.

FIG. 4 is a view illustrating the operating principle of the second chopper circuit 6, FIG. 4(A) illustrates the first chopper circuit 5 and the second chopper circuit 6, FIG. 4(B) illustrates the voltage V1, FIG. 4(C) illustrates the voltage V2, and FIG. 4(D) illustrates the voltage V1+V2. In FIGS. 4(B) to 4(D), the target sinusoidal voltage V* is also illustrated by the thin solid line.

In the second chopper circuit 6, the voltage V1 at the point (c) in FIG. 4(B) is chopped by the third and fourth switch elements 12 and 13 to which the ON/OFF control is alternately performed at the second chopping frequency f2 of 100 Hz.

When the third switch element 12 is on while the fourth switch element 13 is off, the point (e) that is of the series-connected portion of the third and fourth switch elements 12 and 13 becomes the potential equal to that at the point (c) that is of the series-connected portion of the first and second switch elements 10 and 11 in the first chopper circuit 5. When the third switch element 12 is off while the fourth switch element 13 is on, the potential at the point (e) that is of the series-connected portion of the third and fourth switch elements 12 and 13 becomes negative compared with the potential at the point (c). As described above, the voltage V2 at the point (e) that is of the series-connected portion of the third and fourth switch elements 12 and 13 becomes the second pulse voltage series including the plural pulse voltages that fall onto the negative side while the potential at the point (c) that is of the series-connected portion of the first and second switch elements 10 and 11 is set to the second reference potential as illustrated in FIG. 4(C).

When the first switch element 10 of the first chopper circuit 5 is turned on while the second switch element 11 turned off, the third switch element 12 of the second chopper circuit 6 is turned off, and the fourth switch element 13 is turned on, thereby charging the second capacitor 18. When the first switch element 10 of the first chopper circuit 5 is turned off while the second switch element 11 turned on, the third switch element 12 of the second chopper circuit 6 is turned off, and the fourth switch element 13 is turned on, whereby the second capacitor 18 is discharged through the switch elements 11 and 13 that are on. As illustrated in FIG. 4(C), the second capacitor 18 alternately repeats charge during a charge cycle T1 and discharge during a discharge cycle T2 to generate the pulse voltage that falls onto the negative side based on the second reference potential at the point (c). The voltage level Vd2 of the pulse is a half (Vd2=−Vd1/2) of the DC output voltage Vd1 of the photovoltaic panel 1, for example, 400V.

The voltage V2 is the voltage at the point (e) that is of the series-connected portion of the third and fourth switch elements 12 and 13 based on the point (c) that is of the series-connected portion of the first and second switch elements 10 and 11. Accordingly, in the second chopper circuit 6, the voltage V1+V2 in which the voltage between the points (a) and (c) in FIG. 4 (B) and the voltage between the points (c) and (e) in FIG. 4 (C) are added emerges at the point (e) while the potential at the point (a) that is of the ground is set to the first reference potential. That is, the voltage V1+V2 becomes the stepwise waveform voltage that changes alternately into positive and negative values according to the change in target sinusoidal voltage V* in FIG. 4 (D). In the second chopper circuit 6, the pulse voltage series that falls onto the negative side is generated, so that the even harmonics can be removed. In the second chopper circuit 6, the charge and the discharge are repeated with the equal electric power, the effective electric power becomes zero in principle.

Figure 5:
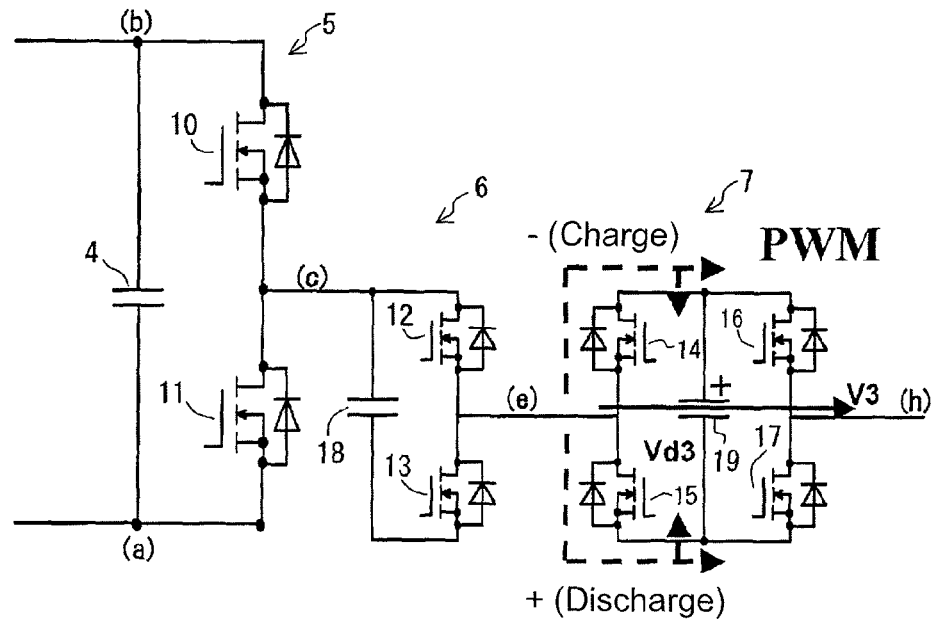
FIG. 5 is a view illustrating an operating principle of a third chopper circuit in FIG. 1.
Figure 6:
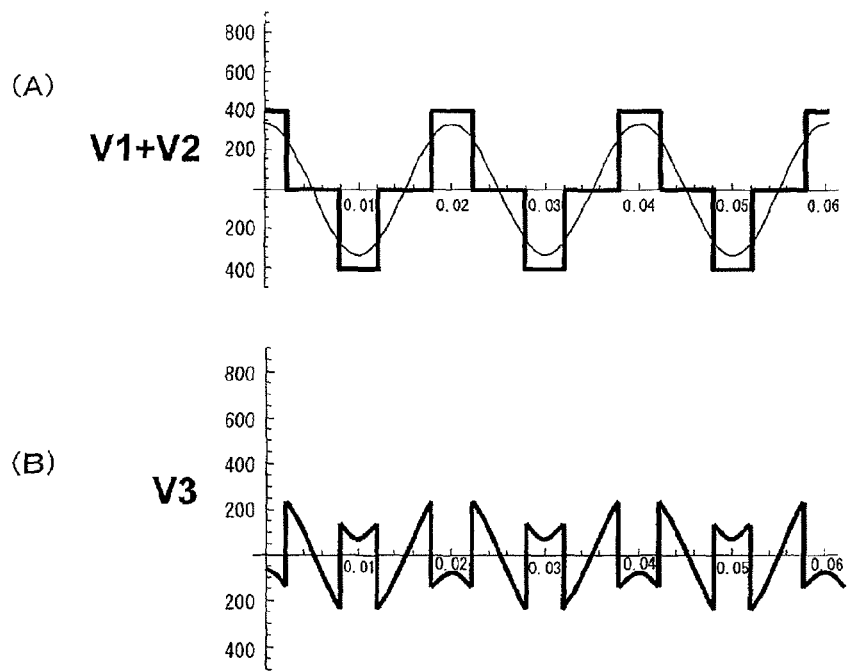
FIG. 6 is a view illustrating a voltage waveform of each unit in FIG. 5.

FIG. 5 is a view illustrating the operating principle of the third chopper circuit 7. FIG. 6 (A) illustrates the stepwise pulse voltage V1+V2, and FIG. 6 (B) illustrates the voltage V3 at the point (h) that is of the series-connected portion of the seventh and eighth switch elements 16 and 17 based on the point (e) that is of the series-connected portion of the fifth and sixth switch elements 14 and 15. In FIG. 6 (A), the target sinusoidal voltage V* is also illustrated by the thin solid line.

The ON/OFF control is performed to the fifth and sixth switch elements 14 and 15 in timing corresponding to the positive and negative difference voltage between the stepwise waveform voltage V1+V2 at the point (e) in FIG. 6 (A) and the target sinusoidal voltage V*. As a result, the third capacitor 19 is charged and discharged at the voltage V1+V2 in timing of the ON/OFF control.

In other words, when the voltage V1+V2 is larger than the target sinusoidal voltage V* (voltage V1+V2>target sinusoidal voltage V*), the difference voltage is positive, the fifth switch element 14 is controlled on, and the sixth switch element 15 is controlled off. Therefore, the third capacitor 19 is charged at the voltage V1+V2.

On the other hand, when the voltage V1+V2 is smaller than the target sinusoidal voltage V* (voltage V1+V2<target sinusoidal voltage V*), the difference voltage is negative, the fifth switch element 14 is controlled off, and the sixth switch element 15 is controlled on. Therefore, the third capacitor 19 charged at the voltage V1+V2 is discharged.

The cycle of the difference voltage is 150 Hz that is of the third chopping frequency f3, and therefore the ON/OFF control is alternately performed to the fifth and sixth switch elements 14 and 15 at the third chopping frequency f3.

Additionally, in the third chopper circuit 7, the seventh and eighth switch elements 16 and 17 are controlled at the PWM frequency f4 of 18 kHz that is higher than several hundred times the first chopping frequency f1 on the on/off duty cycle that corrects the difference voltage between the voltage V1+V2 and the target sinusoidal voltage V*. Therefore, as illustrated in FIG. 6(B), the voltage V3 corresponding to the difference voltage between the stepwise pulse voltage V1+V2 and the target sinusoidal voltage V* emerges at the point (h) that is of the series-connected portion of the seventh and eighth switch elements 16 and 17.

The voltage V3 indicates a PWM average value of the on/off duty cycle control, and the voltage V3 is the voltage at the point (h) that is of the series-connected portion of the seventh and eighth switch elements 16 and 17 based on the point (e) that is of the series-connected portion of the fifth and sixth switch elements 14 and 15.

Accordingly, in the third chopper circuit 7, the target sinusoidal voltage V* emerges at the point (h) that is of the series-connected portion of the seventh and eighth switch elements 16 and 17 based on the first reference potential at the point (a) that is of the ground. The voltage V1+V2 between the points (a) and (e) in FIG. 6 (A) and the voltage V3 between the points (e) and (h) in FIG. 6(B) are added in the target sinusoidal voltage V*, and the target sinusoidal voltage V* is in-phase with the change in electric power system frequency illustrated by the thin solid line in FIG. 6 (A).

Figure 7:
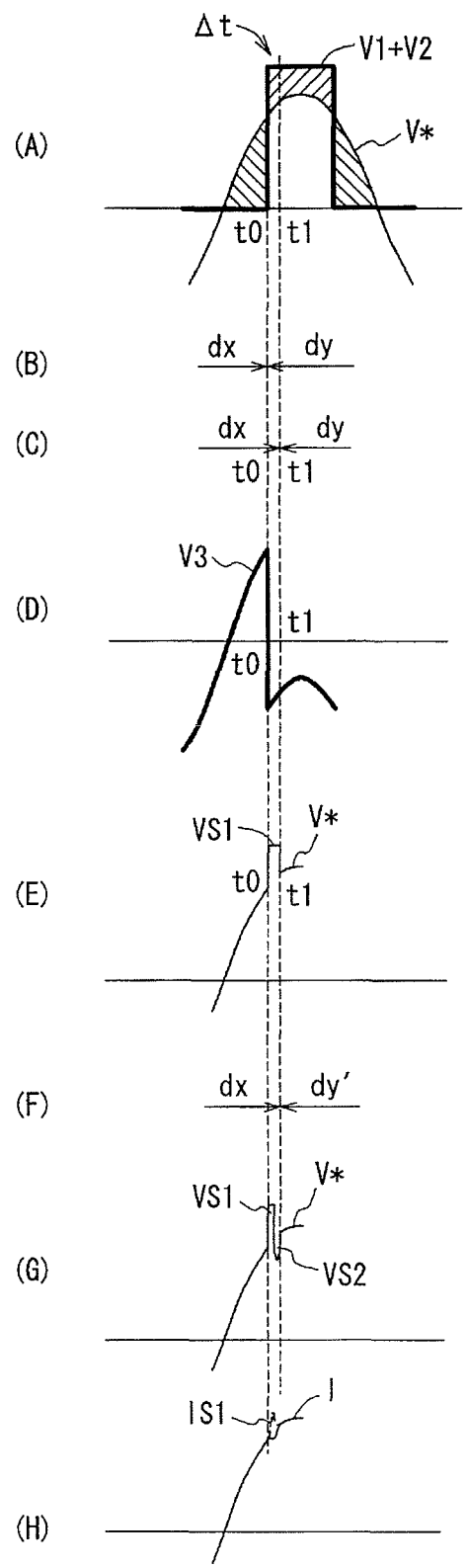
FIG. 7 is a view illustrating a timing chart in which a voltage spike is eliminated from a sinusoidal voltage waveform.
Figure 8:
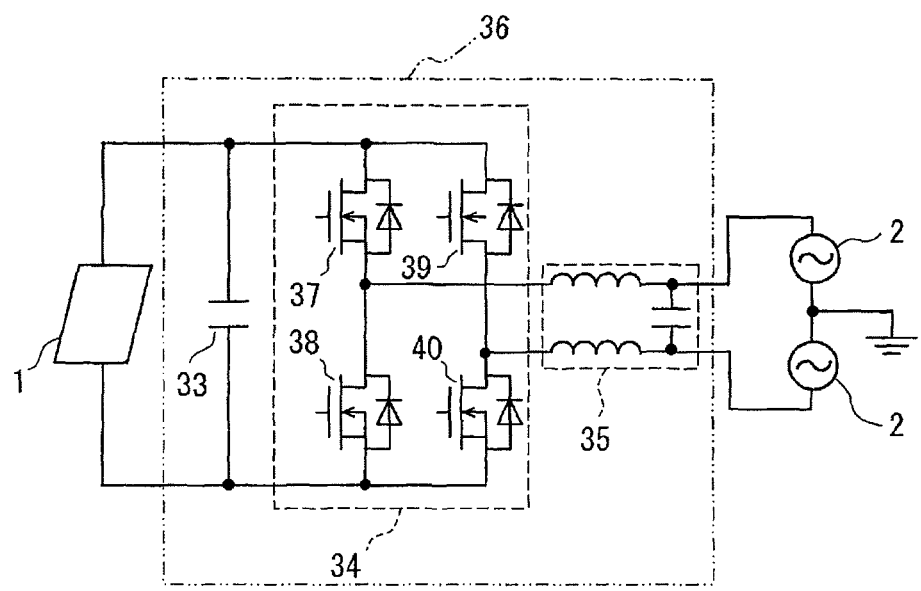
FIG. 8 is a configuration diagram of a conventional example.

The suppression of generation of a voltage spike in part of the target sinusoidal voltage V* in the power conditioner will be described below with reference to FIG. 7. FIG. 7 (A) illustrates waveforms of the pulse voltage V1+V2 and the target sinusoidal voltage V*. FIG. 7 (B) illustrates switching of the on/off duty cycles of the seventh and eighth switch elements 16 and 17, which corresponds to the difference voltage V3 between the pulse voltage V1+V2 and the target sinusoidal voltage V* at around a clock time t0. FIG. 7 (C) illustrates switching of the on/off duty cycles of the seventh and eighth switch elements 16 and 17, which corresponds to the difference voltage V3 between the pulse voltage V1+V2 and the target sinusoidal voltage V* at around a clock time t1. In an on/off duty cycle dx before the clock time t0 in FIG. 7 (B) and an on/off duty cycle dy after the clock time t0, the on/off duty cycles dx and dy change according to the change in difference voltage V3. The on/off duty cycle dx changes gradually before the clock time t0, and the on/off duty cycle dy changes gradually after the clock time t. At the clock time t0, the on/off duty cycle changes suddenly from dx to dy according to the sudden change in difference voltage V3.

In FIG. 7 (B), according to FIG. 7 (A), the timing in which the difference voltage V3 between the pulse voltage V1+V2 and the target sinusoidal voltage V* switches from the relationship of V1+V2<V* to the relationship of V1+V2>V* at the clock time t0 agrees ideally with the timing in which the on/off duty cycles of the seventh and eighth switch elements 16 and 17, which corresponds to the difference voltage V3, switches from the on/off duty cycle dx to the on/off duty cycle dy.

However, actually the timing of the switching between the on/off duty cycles of the seventh and eighth switch elements 16 and 17 is not synchronized with the timing of the switching of the difference voltage. In FIG. 7 (C), according to FIG. 7 (A), the difference voltage V3 between the pulse voltage V1+V2 and the target sinusoidal voltage V* switches from the relationship of V1+V2<V* to the relationship of V1+V2>V* at the clock time t0, and the on/off duty cycles of the seventh and eighth switch elements 16 and 17, which corresponds to the difference voltage V3, switches from the on/off duty cycle dx to the on/off duty cycle dy, and the switching timings are deviated from each other.

FIG. 7 (D) illustrates a waveform of the difference voltage V3 in FIG. 7 (A). Actually, the timing in which the difference voltage V3 changes suddenly is deviated from the timing in which the on/off duty cycle switches from the on/off duty cycle dx to the on/off duty cycle dy. Therefore, as illustrated in FIG. 7 (E), the voltage spike Vs1 is generated in the target sinusoidal voltage V at the actual point (h).

In the control circuit 9, positive and negative of a difference between the third pulse voltage series (V1+V2) and the target sinusoidal voltage V*, namely, the offset between the timing of the chopping according to the positive and negative of the difference voltage V3 and the timing of the switching between the on/off duty cycles of the seventh and eighth switch elements 16 and 17 is calculated using internal calculation means (a calculator processor).

In FIGS. 7 (A) to 7 (C), the offset is a clock time difference Δt between the clock times t0 and t1. After the calculation, the control circuit 9 controls the on/off duty cycles of the seventh and eighth switch elements 16 and 17 according to the timing offset Δt using internal duty control means (a duty controller processor) such that the on/off duty cycle is set to the on/off duty cycle dx before the clock time t0 as illustrated in FIG. 7 (F), and such that the on/off duty cycle is set to the on/off duty cycle dy' during the timing offset Δt after the clock time t0 as illustrated in FIG. 7 (F). After the timing offset Δt elapses, the control circuit 9 sets the on/off duty cycle to the on/off duty cycle dy. In this case, the on/off duty cycle dy' is less than or equal to 100% when the on/off duty cycle dy is 100%, and the on/off duty cycle dy' is greater than or equal to 0% when the on/off duty cycle dy is 0%.

That is, because the on/off duty cycle changes from dy to dy' during Δt after the clock time t1, as illustrated in FIG. 7 (G), a voltage spike Vs1 is generated in the target sinusoidal voltage V* during clock time t0 to Δt. However, a voltage spike Vs2 having a polarity opposite to that of the voltage spike Vs1 is caused to emerge after Δt to cancel the voltage spike Vs1. As a result, the voltage spike waveform is suppressed in the waveform of the sinusoidal voltage V*. Therefore, as illustrated in FIG. 7(H), a broken-line spike current corresponding to the voltage spike Vs1 is eliminated in a sinusoidal current I.

As described above, in the embodiment, the calculation means calculates the offset between the timing in which the third pulse voltage series is chopped according to the positive and negative of the difference with the sinusoidal voltage and the timing of the switching between the on/off duty cycles of the seventh and eighth switch elements. The duty control means controls the on/off duty cycles of the seventh and eighth switch elements according to the timing offset. Therefore, the generation of the voltage spike in part of the waveform of the sinusoidal voltage V* is suppressed. The calculation means and the duty control means can be implemented by software in the control circuit.

The present disclosure includes a power conversion apparatus including a first chopper circuit, a second chopper circuit, and a third chopper circuit.

The first chopper circuit chops the DC voltage at a first chopping frequency, and generates a first pulse voltage series including plural pulse voltages that changes onto the positive sides with respect to the first reference potential in which the voltage level is the ground potential.

The second chopper circuit chops the output of the first chopper circuit at a second chopping frequency higher than the first chopping frequency while the potential at the first pulse voltage series is set to the second reference potential, and the second chopper circuit generates a second pulse voltage series including plural pulse voltages. The voltage level of each of the pulse voltages is lower than that of the positive-side first pulse voltage series, and the pulse voltages change onto the negative side with respect to the second reference potential. Additionally, the second chopper circuit adds the first and second pulse voltage series to generate a third pulse voltage series in which the first and second pulse voltage series change alternately in a sinusoidal manner onto the positive and negative sides with respect to the first reference potential.

The third chopper circuit performs charge and discharge output by chopping the third pulse voltage series at a third chopping frequency that is defined by timing corresponding to the positive and negative of the difference with the sinusoidal voltage. Additionally, the third chopper circuit performs the PWM control to the charge and discharge output at the PWM frequency higher than the third chopping frequency so as to correct the difference between the third pulse voltage series and the sinusoidal voltage, and the third chopper circuit obtains the sinusoidal voltage, which changes continuously on the positive and negative sides with respect to the first reference potential, using the third pulse voltage series and the PWM output.

The present disclosure includes a power generation system including the DC power source and the power conditioner connected to the DC power source. The power generation system converts the DC power generated by the DC power source into the AC power with the power conditioner, and performs the linkage operation with the commercial power source. Particularly, the power conditioner includes the power generation system including pulse voltage generating means (a pulse voltage generator) and sinusoidal voltage generating means (a sinusoidal voltage generator).

The pulse voltage generating means chops the DC voltage from the DC power source at a chopping frequency related with the system frequency, and generates the pulse voltage series including the plural pulse voltages in each of which the voltage level changes alternately in the sinusoidal manner onto the positive and negative sides with respect to the reference potential. Additionally, the pulse voltage generating means performs the charge and discharge output of the pulse voltage series in the timing corresponding to the positive and negative of the difference with sinusoidal voltage.

The sinusoidal voltage generating means performs the PWM control of the charge and discharge output at the PWM frequency higher than the chopping frequency so as to correct the difference between the pulse voltage series and the sinusoidal voltage. Therefore, the sinusoidal voltage generating means obtains the sinusoidal voltage that changes continuously onto the positive and negative sides with respect to the reference potential from the pulse voltage series and the PWM output. Additionally, the sinusoidal voltage generating means outputs the sinusoidal voltage onto the load side.

The present disclosure includes a power generation system including the DC power source and the power conditioner connected to the DC power source. The power generation system converts the DC power generated by the DC power source into the AC power with the power conditioner, and performs the linkage operation with the commercial power source. Particularly, the power conditioner includes a first chopper circuit, a second chopper circuit, and a third chopper circuit.

The first chopper circuit chops the DC voltage from the DC power source at a first chopping frequency that is of the system frequency, and generates the first pulse voltage series including the plural pulse voltages in each of which the voltage level changes on the positive side with respect to the first reference potential.

The second chopper circuit chops the output of the first chopper circuit at a second chopping frequency higher than predetermined times the first chopping frequency while the potential at the first pulse voltage series is set to the second reference potential, and the second chopper circuit generates a second pulse voltage series including plural pulse voltages. The voltage level of each of the pulse voltages is lower than that of the positive-side first pulse voltage series, and the pulse voltages change onto the negative side with respect to the second reference potential. Additionally, the second chopper circuit adds the first and second pulse voltage series to generate a third pulse voltage series in which the first and second pulse voltage series change alternately in a sinusoidal manner onto the positive and negative sides with respect to the first reference potential.

The third chopper circuit performs the charge and discharge output by chopping the third pulse voltage series at a third frequency that is defined by timing corresponding to the positive and negative of the difference with the sinusoidal voltage, and the third chopper circuit performs the PWM control of the charge and discharge output at the PWM frequency higher than the third chopping frequency so as to correct the difference between the third pulse voltage series and the sinusoidal voltage. Additionally, the third chopper circuit obtains the sinusoidal voltage that changes continuously onto the positive and negative sides with respect to the first reference potential using the third pulse voltage series and the PWM output, and outputs the sinusoidal voltage onto the load side.

DESCRIPTION OF SYMBOLS

1 Photovoltaic panel
2 Commercial power source
3 Power conditioner
5 First chopper circuit
10, 11 First and second switch elements
6 Second chopper circuit
12, 13 Third and fourth switch elements
7 Third chopper circuit
14, 15 Fifth and sixth switch elements (first group)
16, 17 Seventh and eighth switch elements (second group)
19 Capacitor

What is claimed is:

1. A power conditioner comprising:
a first switch circuit including a pair of series-connected switches and a first capacitor connected in parallel with the first switch circuit;
a second switch circuit including a pair of series-connected switches and a second capacitor connected in parallel with the second switch circuit; and
a controller processor for alternately turning on and off the pair of series-connected switches of the first switch circuit at a predetermined chopping frequency and for alternately turning on and off the pair of series-connected switches of the second switch circuit at a pulse width modulation (PWM) frequency higher than the predetermined chopping frequency,
the controller processor forming a pulse voltage series that changes in a sinusoidal manner in a first series-connected portion of the pair of switches of the first switch circuit, forming a difference voltage according to a difference between the pulse voltage series and a sinusoidal voltage in a second series-connected portion of the pair of switches of the second switch circuit, and controlling on/off duty cycles of the switches of the second switch circuit to obtain the sinusoidal voltage that changes between positive and negative values, wherein
the controller processor calculates an offset between a timing of switching between positive and negative voltage differences between the pulse voltage series and the sinusoidal voltage and a timing of switching between the on/off duty cycles of the switches of the second switch circuit, and
the controller processor controls the on/off duty cycles of the switches of the second switch circuit according to the calculated offset.

2. A power conditioner comprising:
a first chopper circuit comprising a first switch circuit including series connected first and second switches, the first and second switches configured to be alternately turned on and off at a first chopping frequency, chop a DC voltage from a DC power source, and generate a first pulse voltage series having a first voltage in which a voltage level becomes a positive value with respect to a first reference potential;
a second chopper circuit comprising a parallel-connected circuit that includes a second capacitor and a second switch circuit in which one side of a parallel connection of the parallel-connected circuit is connected to the series-connected portion of the first and second switches, the second switch circuit formed by connecting third and fourth switches in series, the third and fourth switches configured to be alternately turned on and off at a second chopping frequency, the third and fourth switches configured to chop an output of the first chopper circuit while the first pulse voltage series is set to a second reference potential, and generate a second pulse voltage series having a second voltage, a voltage level of the second voltage being lower than that of the first pulse voltage series, the second voltage becoming a negative side value with respect to the second reference potential, the third and fourth switches further configured to add the first and second voltages at of the first and second pulse voltage series to form a third pulse voltage series that changes alternately in a sinusoidal manner between positive and negative values with respect to the first reference potential;
a third chopper circuit comprising series-connected fifth and sixth switches in which a series-connected portion of the fifth and sixth switches is connected to a series-connected portion of the third and fourth switches, the fifth and sixth switches configured to be alternately turned on and off at a third chopping frequency, and perform a charge and discharge output by chopping the third pulse voltage series according to positive and negative voltage differences with a sinusoidal voltage, the third chopper circuit further including series connected seventh and eighth switches, wherein the third chopper circuit turns on and off the seventh and eighth switches at a pulse width modulation (PWM) frequency higher than the third chopping frequency so as to correct a difference between the third pulse voltage series and the sinusoidal voltage, and the third chopper circuit controls on/off duty cycles of the seventh and eighth switches to control the charge and discharge output so as to obtain the sinusoidal voltage that changes continuously between the positive and negative values of the first reference potential; and
a controller processor configured to calculate an offset between a timing of chopping of the third pulse voltage series according to a positive and negative voltage difference with the sinusoidal voltage and a timing of the switching between on/off duty cycles of the seventh and eighth switch, and controls the on/off duty cycles of the seventh and eighth switches according to the calculated offset.

* * * * *